United States Patent
Horng et al.

(10) Patent No.: US 7,976,292 B2
(45) Date of Patent: Jul. 12, 2011

(54) INNER-ROTOR-TYPE HEAT DISSIPATING FAN

(75) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 273 days.

(21) Appl. No.: 12/251,512

(22) Filed: Oct. 15, 2008

(65) Prior Publication Data

US 2010/0073873 A1    Mar. 25, 2010

(30) Foreign Application Priority Data

Sep. 23, 2008 (TW) ................................ 97136470 A

(51) Int. Cl.
F04B 35/04 (2006.01)
(52) U.S. Cl. ................. 417/423.1; 310/88; 310/91
(58) Field of Classification Search .............. 417/352, 417/353, 354, 423.1, 423.7, 423.14, 423.15; 310/62, 63, 88, 91
See application file for complete search history.

(56) References Cited

U.S. PATENT DOCUMENTS

| | | | | |
|---|---|---|---|---|
| 2,823,849 A | * | 2/1958 | Miiller | 417/352 |
| 3,303,995 A | * | 2/1967 | Boeckel | 417/353 |
| 5,786,647 A | * | 7/1998 | Vollmer et al. | 310/89 |
| 5,917,258 A | * | 6/1999 | Kershaw et al. | 310/51 |
| 5,929,544 A | * | 7/1999 | Maekawa et al. | 310/88 |
| 6,069,423 A | * | 5/2000 | Miller et al. | 310/51 |
| 6,076,795 A | * | 6/2000 | Scheidel et al. | 248/603 |
| 6,166,468 A | | 12/2000 | Suzuki et al. | |
| 6,768,242 B1 | | 7/2004 | Suzuki et al. | |
| 7,078,835 B2 | * | 7/2006 | Gross et al. | 310/89 |
| 7,129,608 B2 | | 10/2006 | Eppler et al. | |
| 2007/0176502 A1 | * | 8/2007 | Kasai et al. | 310/71 |
| 2008/0024023 A1 | * | 1/2008 | Jiang et al. | 310/89 |
| 2008/0197731 A1 | * | 8/2008 | Kusano | 310/86 |
| 2010/0098565 A1 | * | 4/2010 | Ishiguro et al. | 417/423.7 |

FOREIGN PATENT DOCUMENTS

TW         200744290       12/2007

* cited by examiner

*Primary Examiner* — Devon C Kramer
*Assistant Examiner* — Bryan Lettman
(74) *Attorney, Agent, or Firm* — Alan Kamrath; Kamrath & Associates PA

(57) ABSTRACT

An inner-rotor-type heat dissipating fan includes a fan housing, a seal casing, an inner-rotor-type motor, an impeller and a circuit board. The fan housing includes an outer frame portion and a motor casing. The seal casing is a hollow housing made of magnetically conductive material. One end of the seal casing forms a connecting portion coupling to the motor casing. The inner-rotor-type motor is mounted inside the seal casing. The impeller is coupled to the inner-rotor-type motor and outside the seal casing. The circuit board is electrically connected to the stator. By this configuration, rotation stability of the impeller is enhanced by the inner-rotor-type motor, airflow generated by rotation of the impeller is effectively concentrated and guided by the fan housing, and a sealing effect for avoiding magnetic flux leakage is provided by the seal casing. Consequently, heat dissipating efficiency is enhanced.

5 Claims, 10 Drawing Sheets

INNER-ROTOR-TYPE HEAT DISSIPATING FAN

BACKGROUND OF THE INVENTION

1. Field of the Invention

The present invention relates to a heat dissipating fan and, more particularly, to a heat dissipating fan including a motor having an inner rotor.

2. Description of the Related Art

Referring to FIG. 1, a conventional heat dissipating fan 70 including an outer-rotor-type motor is shown. Specifically, the heat dissipating fan 70 includes a frame 71 with a shaft tube 711 disposed inside the frame 71 and receiving a bearing 712, a stator 72 mounted around the shaft tube 711, a circuit board 73 mounted around the shaft tube 711 and electrically connecting with the stator 72, and a rotor 74 having a shaft 741 and an impeller 742. One end of the shaft 741 rotatably extends through the bearing 712, and the impeller 742 is mounted to the other end of the shaft 741. The impeller 742 includes a permanent magnet 743 facing the stator 72. The circuit board 73 controls the stator 72 to generate an alternating magnetic field for reacting with the permanent magnet 743, so that the impeller 742 is driven to rotate for heat dissipation purposes.

Said conventional heat dissipating fan 70 is driven by an outer-rotor-type motor. However, in comparison with inner-rotor-type motors, outer-rotor-type motors are generally less stable in rotation and can only provide a lower rotation rate at full speed. However, owing to the current trend of research and development in electronic products, which includes high operation speed, function integrity, and miniaturization, heat dissipation with high efficiency has become an urgent demand. Unfortunately, the conventional heat dissipating fans with outer-rotor-type motors can not fulfill the heat dissipation need of these electronic products.

Taiwan Patent Publication No. 200744290 entitled "FAN AND ITS INNER-ROTOR-TYPE MOTOR" is an example that meets the demand for efficient heat dissipation. As illustrated in FIG. 2, a conventional inner-rotor-type heat dissipating fan 80 includes a housing 81 consisting of a first shell 811 and a second shell 812, a stator 82 having a magnetically conductive member 821, a rotor 83 having a shaft 831 and a magnetic element 832, a driving device 84 electrically connected to the magnetically conductive member 821, and an impeller 85. The shaft 831 is mounted into the housing 81, and the magnetic element 832 inside the housing 81 is mounted around the shaft 831 and faces the magnetically conductive member 821. The impeller 85 is outside the housing 81 and coupled to the shaft 831. The driving device 84 controls the current direction of the magnetically conductive member 821 to cooperate with the magnetic element 832 for generating an alternating magnetic field to drive the rotor 83 and the impeller 85 to rotate.

However, when it is desired to dissipate heat in various electronic products with the heat dissipating fan 80, airflow generated by rotation of the impeller 85 can not be effectively guided to a heat-generating portion in an electronic product since a fan frame is absent from the heat dissipating fan 80. Thus, heat dissipating efficiency of the heat dissipating fan 80 is low.

To overcome the problems of the heat dissipating fan 80 without a fan frame, FIG. 3 shows a conventional heat dissipating fan 90 driven by an inner-rotor-type motor. The heat dissipating fan 90 includes a frame 91 made of plastic material by injection molding, an inner-rotor-type motor 92, an impeller 93 and a circuit board 94. The frame 91 has a fan housing 911 and a motor housing 912 inside the fan housing 911. The inner-rotor-type motor 92 is mounted inside the motor housing 912 and has a shaft 921 with one end thereof extending out of the motor housing 912, a magnetic element 922 mounted around the shaft 921 and a stator 923 surrounding the magnetic element 922 and electrically connected to the circuit board 94. The impeller 93 is outside the motor housing 912 and coupled to the end of the shaft 921 extending out of the motor housing 912. Thus, the inner-rotor-type motor 92 drives the impeller 93 to rotate to dissipate heat.

The frame 91 of the heat dissipating fan 90 is formed by injection molding to guide airflow generated by rotation of the impeller 93. However, since the motor housing 912 of the frame 91 is made of plastic material, the motor housing 912 does not provide sealing effect and allows magnetic flux leakage when the circuit board 94 controls the stator 923 to generate an alternating magnetic field for reacting with the magnetic element 922. Said magnetic flux leakage leads to electromagnetic interference to affect rotating performance of the impeller 93. Hence, heat dissipating efficiency of the heat dissipating fan 90 is decreased.

SUMMARY OF THE INVENTION

It is therefore the primary objective of this invention to provide an inner-rotor-type heat dissipating fan that overcomes the problems of the prior art described above to prevent magnetic flux leakage and electromagnetic interference.

An inner-rotor-type heat dissipating fan according to the preferred teachings of the present invention includes a fan housing, a seal casing, an inner-rotor-type motor, an impeller and a circuit board. The fan housing includes an outer frame portion having an air inlet and an air outlet respectively in two ends thereof and having a motor casing coupling to the outer frame portion through a plurality of connecting members. A passageway connects to and between the air inlet and the air outlet. The seal casing is a hollow housing made of magnetically conductive material. One end of the seal casing forms a connecting portion coupling to the motor casing. The inner-rotor-type motor is mounted inside the seal casing and includes a rotor and a stator. The rotor is rotatably received in the stator and has a shaft and a magnetic element fixed to an outer periphery of the shaft and facing the stator. The impeller is coupled to the shaft and outside the seal casing. The circuit board is electrically connected to the stator. By this configuration, rotation stability of the impeller is enhanced by the inner-rotor-type motor, airflow generated by rotation of the impeller is effectively concentrated and guided by the fan housing, and a sealing effect for avoiding magnetic flux leakage and electromagnetic interference is provided by the seal casing. Accordingly, heat dissipating efficiency is enhanced.

In an example, the seal casing forms a recession in an outer periphery thereof, and the motor casing forms an engaging portion on an inner periphery thereof. The engaging portion engages with the recession while the seal casing is received in the motor casing. Accordingly, the seal casing does not disengage from and rotate relative to the motor casing, such that a reliable coupling is provided.

In an example, a protrusion is formed on an inner periphery of the seal casing. The stator forms a groove in an outer periphery thereof, with the protrusion engaging with the groove. Accordingly, the stator does not rotate inside and relative to the seal casing, and convenience in assembling is provided.

In an example, the motor casing is a sleeve having a positioning portion formed on an inner periphery thereof. A positioning member and an end cap are mounted in the motor casing, with two axial sides of the positioning member respectively abutting against the positioning portion and engaging with the end cap. The circuit board is disposed between the positioning member and the end cap, with the circuit board being spaced from the stator by the positioning member. Accordingly, heat dissipating effect of the circuit board is prevented from being adversely affected by the large amount of heat resulting from operation of the stator to avoid damage to the associated electronic elements.

In an example, the motor casing is a sleeve having a supporting portion formed on an inner periphery thereof, with the connecting portion of the seal casing abutting against the supporting portion. Accordingly, combination of the seal casing and the motor casing is improved.

In an example, the connecting portion of the seal casing includes an outwardly-expanding section, while an annular shoulder is formed on an outer periphery of the seal casing and adjacent to the outwardly-expanding section. A positioning portion is formed on an inner periphery of the motor casing of the fan housing, with the annular shoulder and the positioning portion abutting against and combining with each other. Accordingly, combination of the seal casing and the motor casing is improved.

In an example, a plurality of flexible retaining plates is formed on a bottom edge of the outwardly-expanding section. Accordingly, the circuit board and other related components are retained from disengaging.

Further scope of the applicability of the present invention will become apparent from the detailed description given hereinafter. However, it should be understood that the detailed description and specific examples, while indicating preferable embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
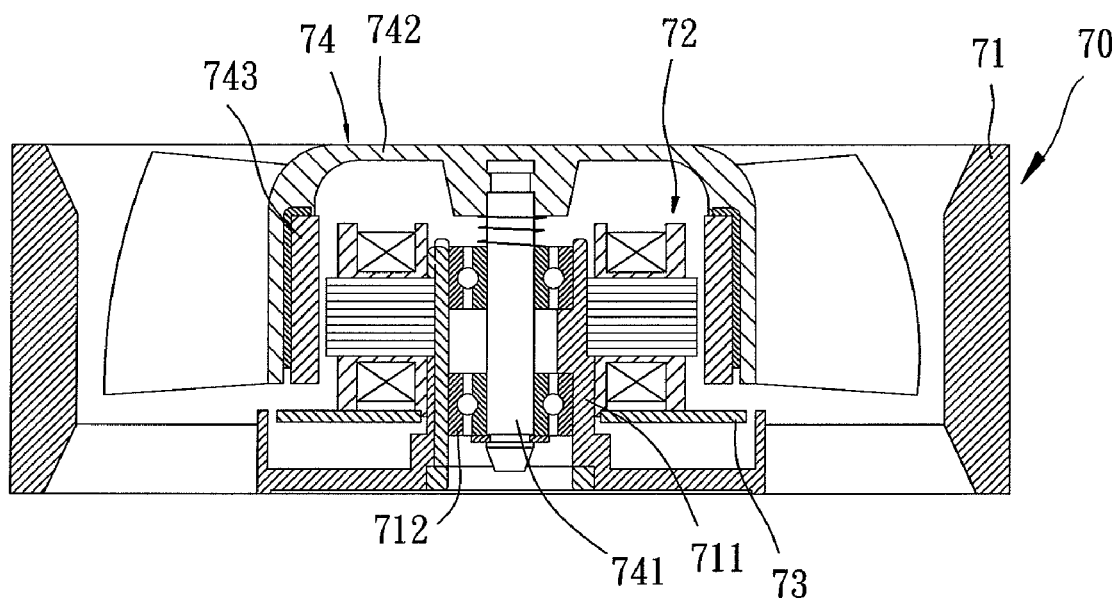
FIG. 1 is a cross sectional view illustrating a conventional heat dissipating fan including an outer-rotor-type motor.
Figure 2:
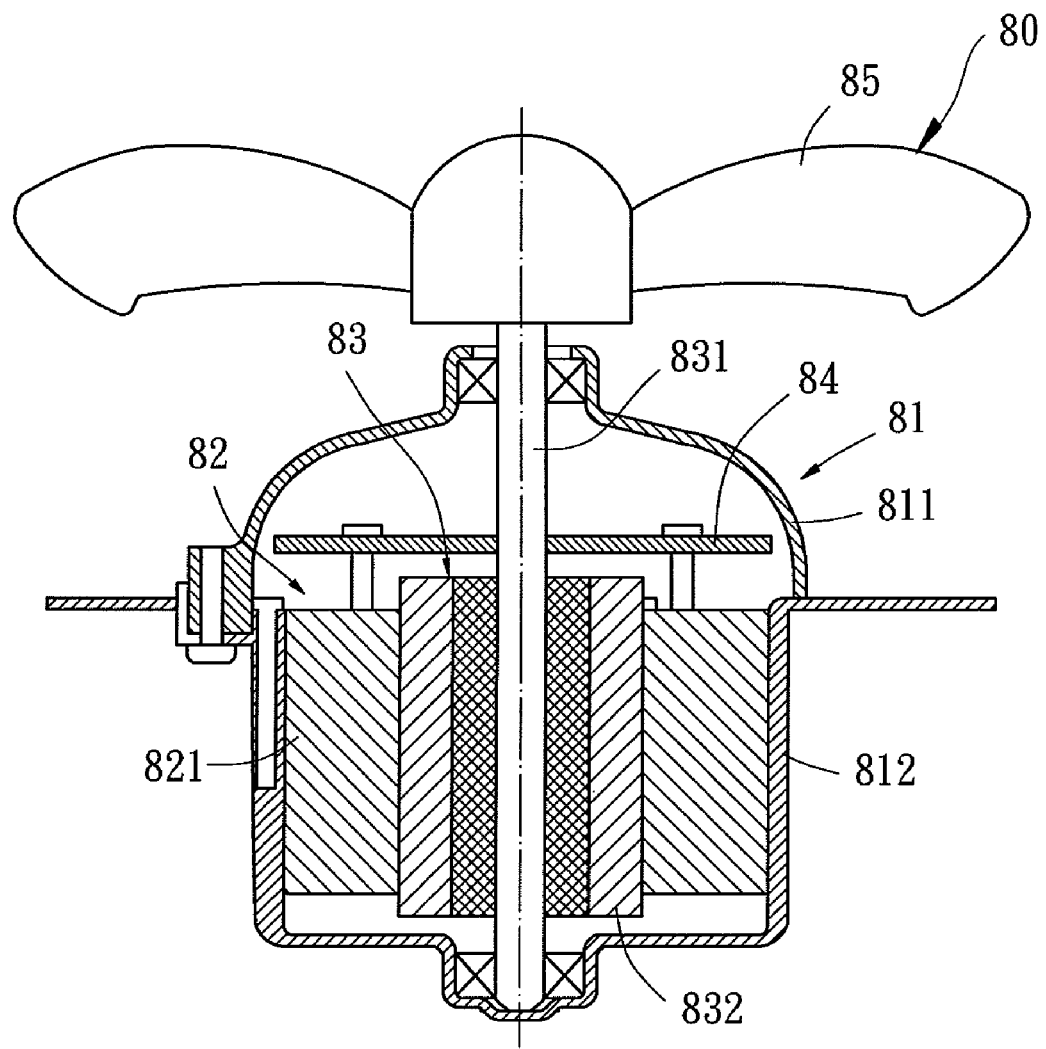
FIG. 2 is a cross sectional view illustrating a conventional heat dissipating fan including an inner-rotor-type motor.
Figure 3:
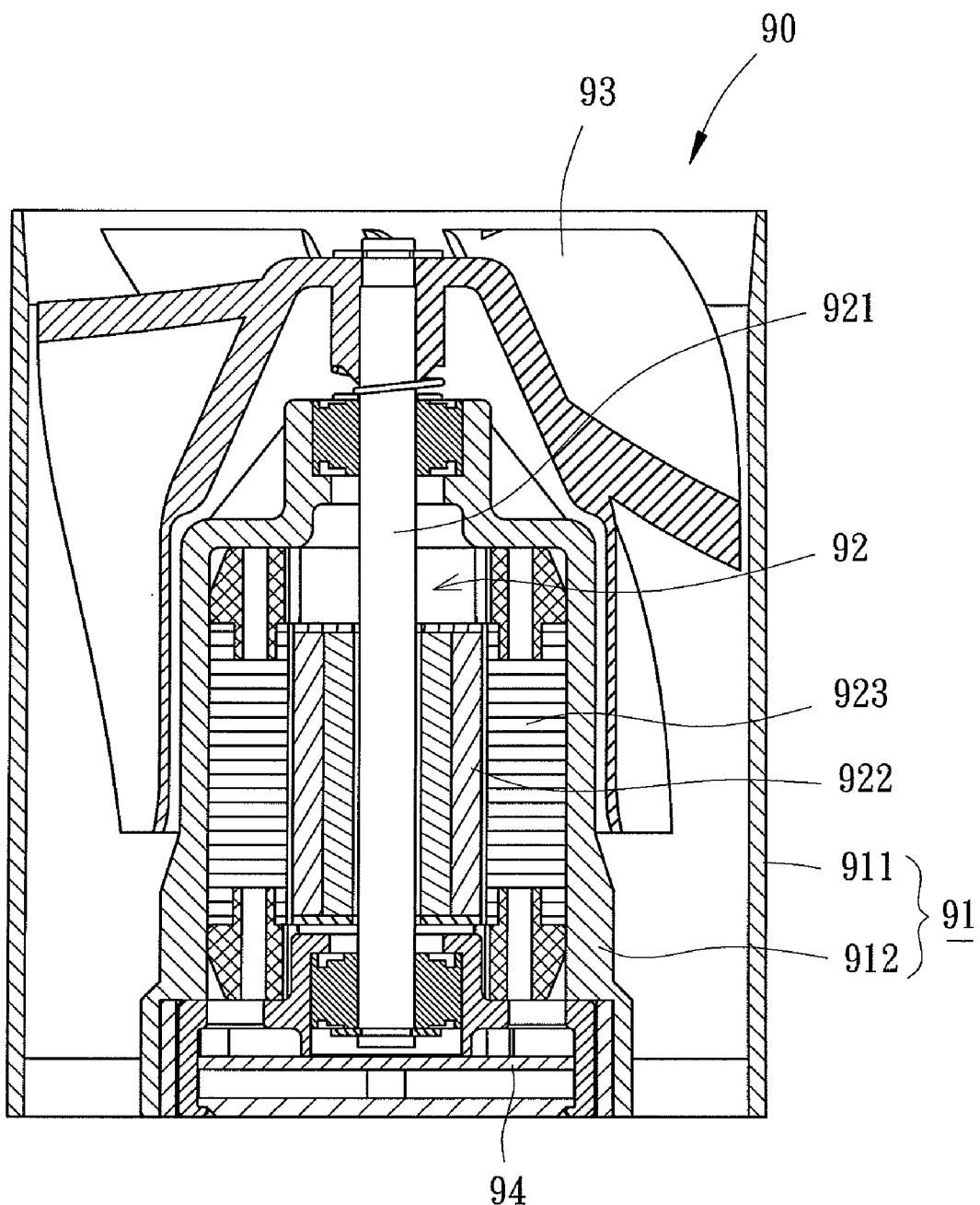
FIG. 3 is a cross sectional view illustrating another conventional heat dissipating fan including an inner-rotor-type motor.

In the various figures of the drawings, the same numerals designate the same or similar parts. Furthermore, when the terms "first", "second", "portion", "section", "annular", "inner", "outer", "radial", "axial" and similar terms are used hereinafter, it should be understood that these terms have reference only to the structure shown in the drawings as it would appear to a person viewing the drawings and are utilized only to facilitate describing the invention.

DETAILED DESCRIPTION OF THE INVENTION

Figure 4:
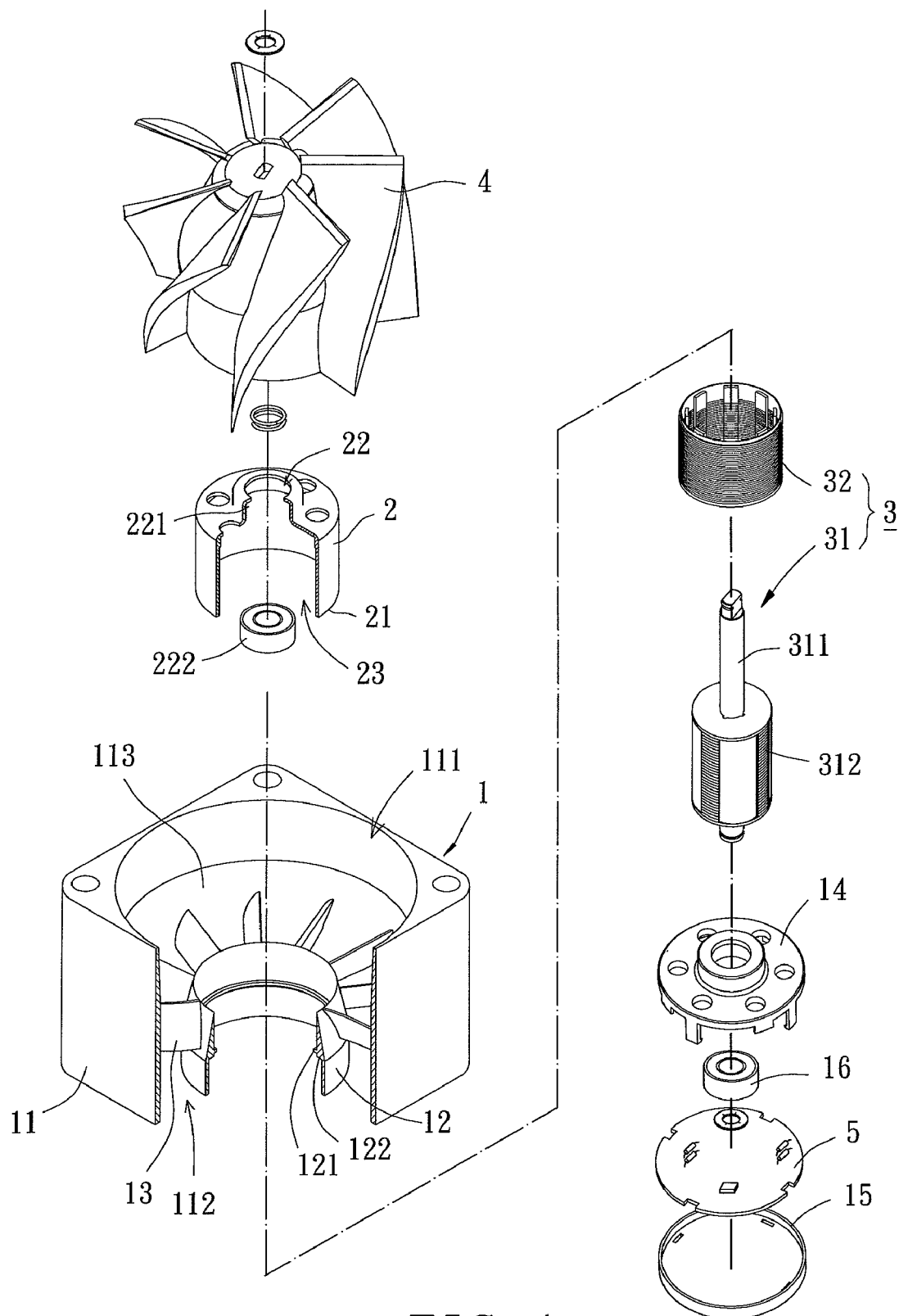
FIG. 4 is an exploded perspective view illustrating an inner-rotor-type heat dissipating fan in accordance with a first embodiment of the present invention.
Figure 5:
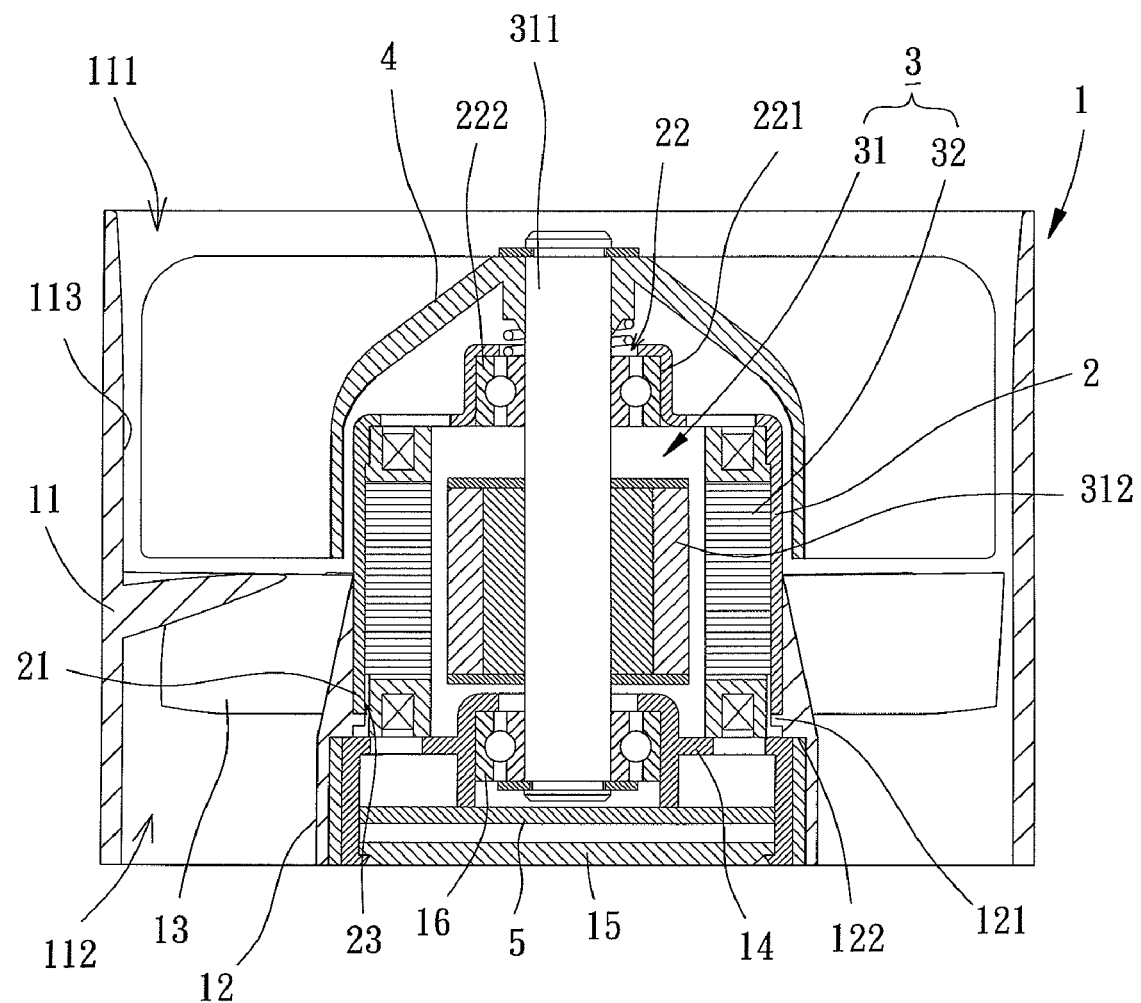
FIG. 5 is a cross sectional view illustrating the inner-rotor-type heat dissipating fan in accordance with the first embodiment of the present invention.

An inner-rotor-type heat dissipating fan of a first embodiment according to the preferred teachings of the present invention is shown in FIGS. 4 and 5 of the drawings. According to the first embodiment form shown, the inner-rotor-type heat dissipating fan includes a fan housing 1 made of plastic material and formed by injection molding, a seal casing 2 mounted inside the fan housing 1, an inner-rotor-type motor 3 mounted inside the seal casing 2, an impeller 4 coupled to the inner-rotor-type motor 3 and a circuit board 5 electrically connected to the inner-rotor-type motor 3 to control the inner-rotor-type motor 3 for driving the impeller 4 to rotate. Thus, airflow generated by rotation of the impeller 4 is concentrated and guided by the fan housing 1, and the seal casing 2 provides a sealing effect for avoiding magnetic flux leakage and electromagnetic interference.

According to the preferred form shown, the fan housing 1 includes an outer frame portion 11 and a hollow motor casing 12. The outer frame portion 11 has an air inlet 111 and an air outlet 112 respectively in two ends thereof, with a passageway 113 connecting to and between the air inlet 111 and the air outlet 112. The hollow motor casing 12 is formed in the passageway 113 and connected to the outer frame portion 11 by a plurality of connecting members 13. Preferably, the connecting members 13 are adjacent to the air outlet 112 of the outer frame portion 11 and can be in the form of ribs or fixed blades. Furthermore, as shown in FIG. 4, the motor casing 12 is preferably a sleeve with two openings in two ends thereof and facing the air inlet 111 and the air outlet 112 respectively. A supporting portion 121 and a positioning portion 122 are formed on an inner periphery of the motor casing 12 and extend in a radial direction of the motor casing 12. Each of the supporting portion 121 and the positioning portion 122 can be selected from an annular rib or plural blocks that are annularly arranged. Besides, a positioning member 14 and an end cap 15 are mounted in the motor casing 12, with the positioning member 14 having an axial through-hole in a central portion thereof receiving a first bearing 16. Two axial sides of the positioning member 14 respectively abut against the positioning portion 122 and engage with the end cap 15.

The seal casing 2 is a hollow housing made of magnetically conductive material, with one end of the seal casing 2 forming a connecting portion 21 which abuts against the supporting portion 121 of the motor casing 12. Furthermore, in order to assist in assembly of the inner-rotor-type motor 3, the seal casing 2 includes a first opening 22 at an end thereof facing the air inlet 111 and a second opening 23 at the other end thereof facing the air outlet 112. The seal casing 2 further includes a compartment 221 in communication with the first opening 22 for receiving a second bearing 222.

The inner-rotor-type motor 3 mounted inside the seal casing 2 includes a rotor 31 and a stator 32 in which the rotor 31 is rotatably received. The rotor 31 has a shaft 311 and a magnetic element 312 fixed to an outer periphery of the shaft 311 and facing the stator 32. One end of the shaft 311 extends through the seal casing 2 via the first opening 22 and into the positioning member 14 via the second opening 23 in sequence, with the first bearing 16 and the second bearing 222 being mounted around the shaft 311. Thus, the shaft 311 can rotate in the seal casing 2 through use of the first and second bearings 16, 222.

The impeller 4 is coupled to the other end of the shaft 311 and outside the seal casing 2 to align with the air inlet 111. The circuit board 5 is fixed to the positioning member 14 and between the end cap 15 and the positioning member 14. The circuit board 5 is electrically connected to the stator 32 and fixed in a position spaced from the stator 32 by the positioning member 14 to prevent the heat dissipation of the circuit board 5 from being adversely affected by the large amount of heat resulting from operation of the stator 32. The end cap 15 is mounted to and, thus, seals one opening of the motor casing 12 adjacent to the air outlet 112, so as to avoid disengagement of the circuit board 5.

In assembly, the outer frame portion 11 and the motor casing 12 are integrally formed by injection molding. The seal casing 2 also can be placed into the mold used in injection molding process, such that the motor casing 12 can surround the seal casing 2 and contact with the connecting portion 21 of the seal casing 2, with the seal casing 2 and the motor casing 12 being attached to each other firmly. Alternatively, the fan housing 1 is formed by injection molding in advance, and, then, the seal casing 2 adjacent to the connecting portion 21 is fixed into the motor casing 12 by close-fit, with the connecting portion 21 of the seal casing 2 abutting against the supporting portion 121 of the motor casing 12. After the fan housing 1 and the seal casing 2 are assembled, all related components of the inner-rotor-type motor 3 are mounted inside the seal casing 2, and arrangements of the impeller 4, the circuit board 5 and other components are completed to form the inner-rotor-type heat dissipating fan of the present invention.

Figure 6:
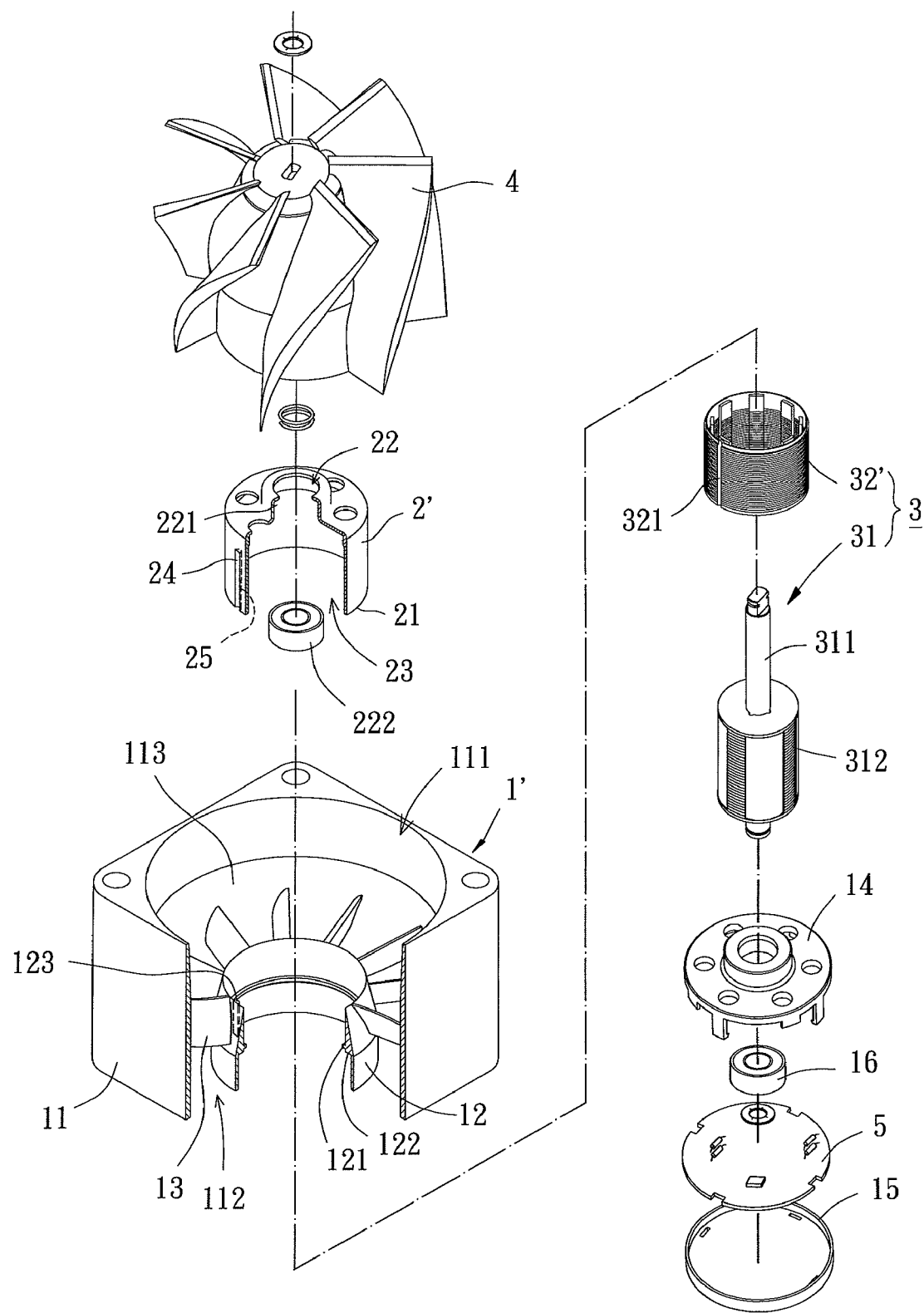
FIG. 6 is an exploded perspective view illustrating an inner-rotor-type heat dissipating fan in accordance with a second embodiment of the present invention.
Figure 7:
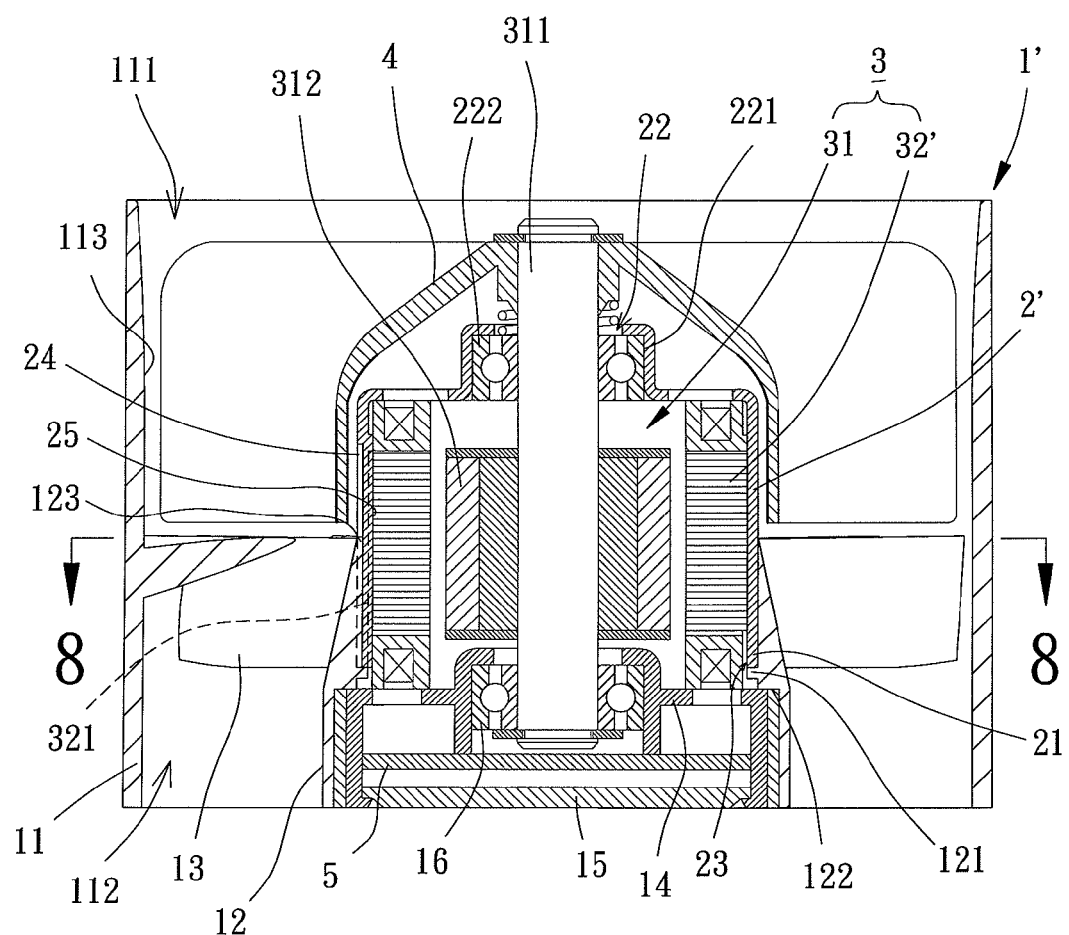
FIG. 7 is a cross sectional view illustrating the inner-rotor-type heat dissipating fan in accordance with the second embodiment of the present invention.

Please refer to FIGS. 6 and 7, an inner-rotor-type heat dissipating fan of a second embodiment according to the preferred teachings of the present invention is shown. The inner-rotor-type heat dissipating fan also includes a fan housing 1', a seal casing 2', a inner-rotor-type motor 3, an impeller 4 and a circuit board 5, wherein configurations of the fan housing 1', the seal casing 2', the inner-rotor-type motor 3, the impeller 4 and the circuit board 5 are similar to those of the first embodiment. The major difference between the first embodiment and the second embodiment is shown as the following.

Figure 8:
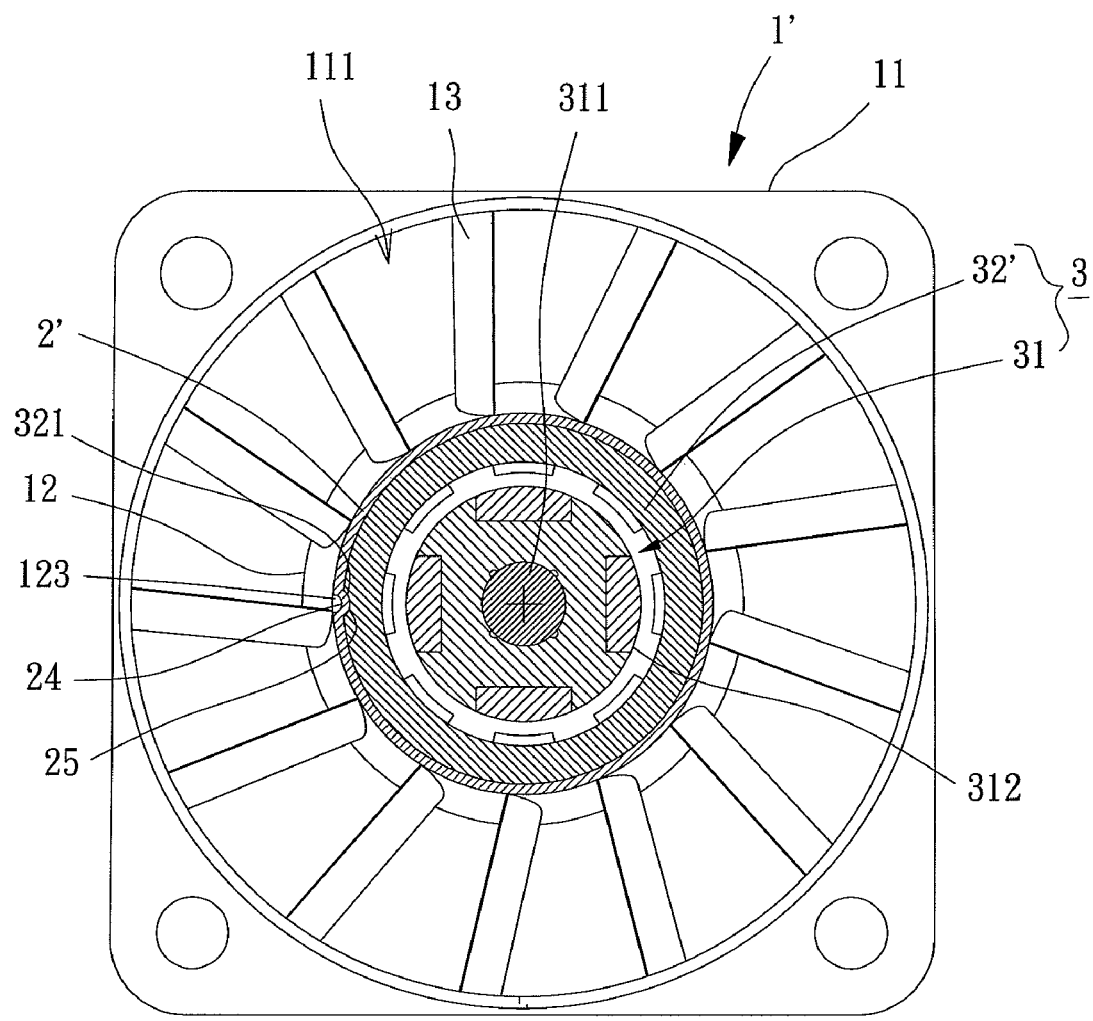
FIG. 8 is a cross sectional view, taken along line 8-8 in FIG. 7, illustrating the inner-rotor-type heat dissipating fan in accordance with the second embodiment of the present invention.

The seal casing 2' forms a recession 24 in an outer periphery thereof by punching, while a protrusion 25 corresponding to the recession 24 is formed on an inner periphery of the seal casing 2'. Further, the stator 32' forms a groove 321 in an outer periphery thereof and aligned with the protrusion 25. Turning now to FIG. 8, an engaging portion 123 is further formed on an inner periphery of the motor casing 12 and aligned with the recession 24 of the seal casing 2' when the fan housing 1' is formed by injection molding. While the seal casing 2' is received in the motor casing 12, the engaging portion 123 of the motor casing 12 engages with the recession 24 of the seal casing 2', such that the seal casing 2' is fixed not to disengage from and rotate relative to the motor casing 12. The groove 321 of the stator 32' engages with the protrusion 25 of the seal casing 2' while the stator 32' is received in the seal casing 2', so that the stator 32' does not rotate relative to the seal casing 2'. Thus assembling convenience is provided.

Figure 9:
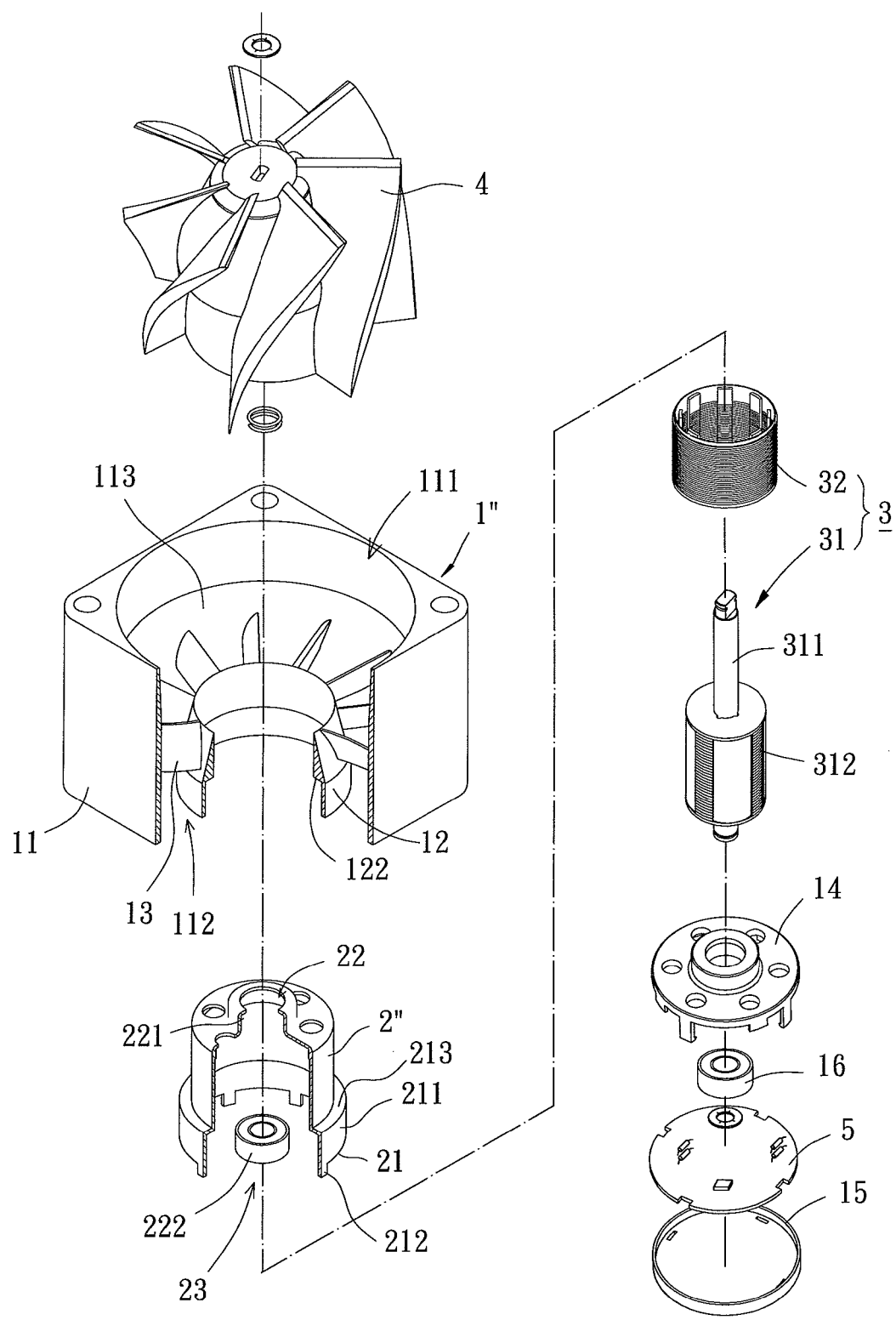
FIG. 9 is an exploded perspective view illustrating an inner-rotor-type heat dissipating fan in accordance with a third embodiment of the present invention.
Figure 10:
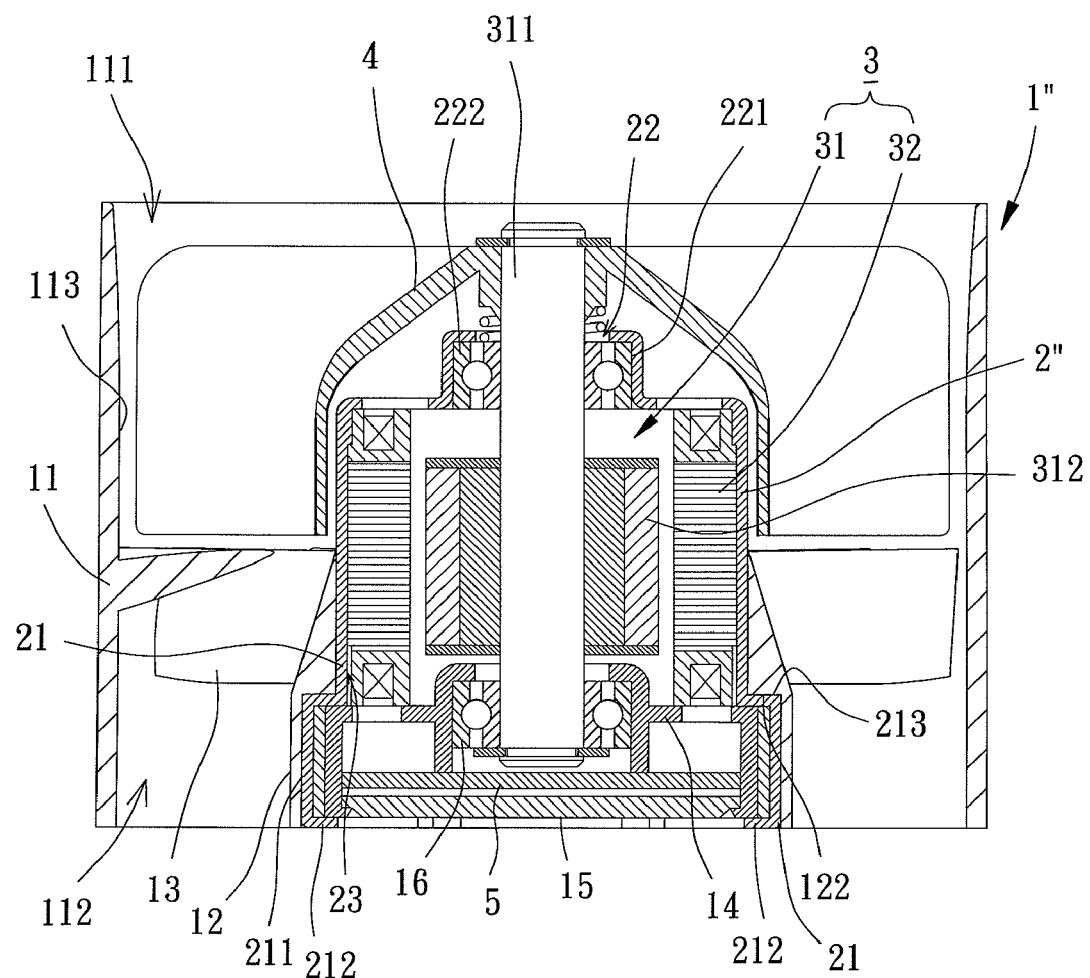
FIG. 10 is a cross sectional view illustrating the inner-rotor-type heat dissipating fan in accordance with the third embodiment of the present invention.

Please refer to FIGS. 9 and 10, an inner-rotor-type heat dissipating fan of a third embodiment according to the preferred teachings of the present invention is shown. The inner-rotor-type heat dissipating fan also includes a fan housing 1", a seal casing 2", a inner-rotor-type motor 3, an impeller 4 and a circuit board 5, wherein configurations of the fan housing 1", the seal casing 2", the inner-rotor-type motor 3, the impeller 4 and the circuit board 5 are similar to those of the first embodiment. The major difference between the first embodiment and the third embodiment is shown as following.

The connecting portion 21 of the seal casing 2" includes an outwardly-expanding section 211 and a plurality of flexible retaining plates 212 formed on a bottom edge of the outwardly-expanding section 211. An annular shoulder 213 is formed on an outer periphery of the seal casing 2", with the outwardly-expanding section 211 interconnecting between the annular shoulder 213 and the flexible retaining plates 212. The supporting portion 121 is absent from the fan housing 1". After the fan housing 1" is formed by injection molding, the annular shoulder 213 of the seal casing 2" and the positioning portion 122 of the motor casing 12 abut against and combine with each other while the seal casing 2" is received in the motor casing 12. Thus, the seal casing 2" is steadily fixed not to disengage from and rotate relative to the motor casing 12. Besides, the flexible retaining plates 212 are bent to form hooks to retain the circuit board 5, the positioning member 14 and the end cap 15, after the circuit board 5, the positioning member 14 and the end cap 15 are received in the seal casing 2", enhancing coupling stability. Alternatively, the seal casing 2", the circuit board 5, the positioning member 14 and the end cap 15 can be riveted together to enhance convenience in assembling.

In use, the inner-rotor-type heat dissipating fan of the present invention can be mounted to any predetermined heat-generating portion of various electronic products, with the air outlet 112 toward the predetermined heat-generating portion. The circuit board 5 controls the stator 32, 32' of the inner-rotor-type motor 3 to proceed with energizing for creating an alternating magnetic field to react with the magnetic element 312 of the rotor 31 for flux linkage between the stator 32 and the magnetic element 312, so as to drive the shaft 311 of the rotor 31 and hence the impeller 4 to rotate. When the impeller 4 rotates, airflow is guided into the passageway 113 via the air inlet 111 of the fan housing 1. The airflow is concentrated in the passageway 113 and then guided via the air outlet 112 to dissipate heat generated by the electronic products.

As has been discussed above, rotation stability and rotation rate of the rotor 31 and the impeller 4 are enhanced by utilizing inner-rotor-type motor 3, and heat dissipating efficiency of the inner-rotor-type heat dissipating fan of the present invention is enhanced by the fan housing 1 that guides and concentrates the airflow generated from the impeller 4 effectively. Most importantly, the seal casing 2, 2', 2" receives the inner-rotor-type motor 3 to provide sealing effect for preventing magnetic flux leakage and electromagnetic interference when the circuit board 5 controls the stator 32, 32' to generate an alternating magnetic field for reacting with the magnetic element 312. As a result, rotating performance of the impeller 4 improves heat dissipating efficiency of the inner-rotor-type heat dissipating fan.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An inner-rotor-type heat dissipating fan, comprising:
a fan housing including an outer frame portion having an air inlet and an air outlet respectively in two ends thereof, and a motor casing coupling to the outer frame portion through a plurality of connecting members, with a passageway connecting to and between the air inlet and the air outlet, wherein the motor casing is a sleeve having first and second openings and includes a positioning portion in a form of a shoulder inside the sleeve between the first and second openings;
a seal casing being a hollow housing made of magnetically conductive material, with the seal casing inserted into the first opening of the sleeve and being spaced from the second opening, with one end of the seal casing forming a connecting portion coupling to the motor casing;
an inner-rotor-type motor mounted inside the seal casing and including a rotor and a stator rotatably receiving the rotor, with the rotor having a shaft and a magnetic element fixed to an outer periphery of the shaft and facing the stator, with the shaft extending through the first opening and into a positioning member, with the positioning member inserted through the second opening and abutting with the positioning portion;
an impeller coupled to the shaft and outside the seal casing and the first opening; and
a circuit board electrically connected to the stator,
wherein the sleeve has a supporting portion formed on an inner periphery thereof and intermediate the positioning portion and the first opening, with the connecting portion of the seal casing abutting against the supporting portion.

2. The inner-rotor-type heat dissipating fan as defined in claim 1, wherein the seal casing forms a recession in an outer periphery thereof and the motor casing forms an engaging portion on an inner periphery of the sleeve, with the engaging portion slideably engaging with the recession parallel to the shaft while the seal casing is received in the motor casing.

3. The inner-rotor-type heat dissipating fan as defined in claim 2, wherein a protrusion is formed on an inner periphery of the seal casing by the recession and the stator forms a groove in an outer periphery thereof, with the protrusion slideably engaging with the groove parallel to the shaft.

4. The inner-rotor-type heat dissipating fan as defined in claim 1, wherein the positioning member and an end cap are mounted in the motor casing, with the end cap closing the second opening, with two axial sides of the positioning member respectively abutting against the positioning portion and engaging with the end cap, with the circuit board being disposed between the positioning member and the end cap, with the circuit board being spaced from the stator by the positioning member.

5. An inner-rotor-type heat dissipating fan, comprising:
a fan housing including an outer frame portion having an air inlet and an air outlet respectively in two ends thereof, and a motor casing coupling to the outer frame portion through a plurality of connecting members, with a passageway connecting to and between the air inlet and the air outlet, wherein the motor casing is a sleeve having first and second openings and includes a positioning portion in a form of a shoulder inside the sleeve between the first and second openings;
a seal casing being a hollow housing made of magnetically conductive material, with the seal casing inserted into the second opening of the sleeve and passing through the first opening, with the seal casing forming a connecting portion coupling to the positioning portion of the motor casing;
an inner-rotor-type motor mounted inside the seal casing and including a rotor and a stator rotatably receiving the rotor, with the rotor having a shaft and a magnetic element fixed to an outer periphery of the shaft and facing the stator, with the shaft extending through the first opening and into a positioning member, with the positioning member inserted through the second opening and abutting with the connecting portion of the seal casing;
an impeller coupled to the shaft and outside the seal casing and the first opening; and
a circuit board electrically connected to the stator,
wherein the connecting portion of the seal casing includes an outwardly-expanding section and an annular shoulder is formed on an outer periphery of the seal casing and adjacent to the outwardly-expanding section, with the annular shoulder and the positioning portion abutting against and combining with each other, and
wherein a plurality of flexible retaining plates are formed on a bottom edge of the outwardly-expanding section and bent to form hooks retaining the circuit board.

* * * * *